(12) United States Patent
Musa et al.

(10) Patent No.: US 7,590,868 B2
(45) Date of Patent: Sep. 15, 2009

(54) METHOD AND APPARATUS FOR MANAGING ENCRYPTED DATA ON A COMPUTER READABLE MEDIUM

(75) Inventors: Mehmet Musa, San Jose, CA (US); Hemant Mittal, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 11/055,245

(22) Filed: Feb. 9, 2005

(65) Prior Publication Data

US 2006/0179327 A1    Aug. 10, 2006

(51) Int. Cl.
*H04L 9/00* (2006.01)
(52) U.S. Cl. .................. 713/193; 713/165; 713/166; 713/167; 713/172; 713/187; 713/188; 713/189; 713/194; 711/117; 711/122; 380/45; 380/281; 380/284
(58) Field of Classification Search .................. 713/165, 713/166, 167, 187–189, 172, 193, 194; 711/117, 711/122; 380/45, 281, 284
See application file for complete search history.

(56) References Cited

U.S. PATENT DOCUMENTS

| | | | | |
|---|---|---|---|---|
| 5,584,023 A * | 12/1996 | Hsu | .............. | 707/204 |
| 5,721,777 A * | 2/1998 | Blaze | .............. | 380/286 |
| 5,870,468 A * | 2/1999 | Harrison | .............. | 713/165 |
| 5,940,507 A * | 8/1999 | Cane et al. | .............. | 713/165 |
| 6,158,004 A * | 12/2000 | Mason et al. | .............. | 713/150 |
| 6,249,866 B1 * | 6/2001 | Brundrett et al. | .............. | 713/165 |
| 6,405,315 B1 * | 6/2002 | Burns et al. | .............. | 713/190 |
| 6,674,743 B1 * | 1/2004 | Amara et al. | .............. | 370/351 |
| 6,862,624 B2 * | 3/2005 | Colby et al. | .............. | 709/226 |
| 6,868,071 B1 * | 3/2005 | Jensen et al. | .............. | 370/256 |
| 6,954,770 B1 * | 10/2005 | Carlson et al. | .............. | 708/251 |
| 6,986,043 B2 * | 1/2006 | Andrew et al. | .............. | 713/166 |
| 7,116,785 B2 * | 10/2006 | Okaue | .............. | 380/278 |
| 7,124,249 B1 * | 10/2006 | Darcy | .............. | 711/122 |
| 7,197,638 B1 * | 3/2007 | Grawrock et al. | .............. | 713/165 |
| 7,343,493 B2 * | 3/2008 | Challener et al. | .............. | 713/193 |
| 2001/0044901 A1 * | 11/2001 | Grawrock | .............. | 713/189 |
| 2002/0111133 A1 * | 8/2002 | Wittkotter | .............. | 455/1 |
| 2003/0046366 A1 * | 3/2003 | Pardikar et al. | .............. | 709/219 |
| 2004/0093506 A1 * | 5/2004 | Grawrock et al. | .............. | 713/189 |
| 2005/0027693 A1 * | 2/2005 | Yagawa | .............. | 707/3 |
| 2005/0111663 A1 * | 5/2005 | Lotspiech et al. | .............. | 380/239 |
| 2006/0005231 A1 * | 1/2006 | Zuk et al. | .............. | 726/3 |
| 2006/0039554 A1 * | 2/2006 | Fry | .............. | 380/29 |
| 2006/0085636 A1 * | 4/2006 | Osaki | .............. | 713/165 |
| 2006/0090072 A1 * | 4/2006 | Asano et al. | .............. | 713/168 |
| 2006/0126850 A1 * | 6/2006 | Dawson et al. | .............. | 380/284 |
| 2006/0129490 A1 * | 6/2006 | Collar et al. | .............. | 705/51 |
| 2006/0143476 A1 * | 6/2006 | McGovern | .............. | 713/191 |

* cited by examiner

*Primary Examiner*—Carl Colin

(57) ABSTRACT

A method and apparatus for managing encrypted data on a computer readable medium wherein an encryption key is determined for a received quantum of data. The quantum of data is encrypted according to the encryption key at a volume level when the quantum of data comprises volume data. The quantum of data is encrypted according to the encryption key at a file level when the data comprises file data. The encrypted data is then directed to a computer readable medium.

41 Claims, 19 Drawing Sheets

FIG. 13

VOLUME KEY TABLE (360)

| VOLUME ID (395) | USER ID (400) | USER ACCESS KEY (405) | ENCRYPTED VOLUME KEY (410) |
|---|---|---|---|
| | | | |
| | | | |
| | | | |
| | | | |

FILE KEY TABLE

| FILE ID 415 | USER ID 420 | USER ACCESS KEY 425 | ENCRYPTED FILE KEY 430 |
|---|---|---|---|
| | | | |
| | | | |
| | | | |
| | | | |

FIG. 14

TEMPORAL KEY TABLE

| VOLUME ID 435 | FILE ID 440 | TEMPORAL KEY 445 |
|---|---|---|
|  |  |  |
|  |  |  |
|  |  |  |
|  |  |  |

METHOD AND APPARATUS FOR MANAGING ENCRYPTED DATA ON A COMPUTER READABLE MEDIUM

BACKGROUND

Secure data management has been supported for many years. Generally, there are two classes of file security mechanisms. One file security mechanism relies on a standalone computer application that receives a file from a file system. Typically, the file received from the file system is non-encrypted. The standalone application encrypts the file and writes an encrypted version of the file back to a computer readable medium. It is clearly understood that the original file is stored on the computer readable medium in a non-encrypted manner. Consequently, there is no security offered because non-encrypted data can easily be compromised from the computer readable medium. It is only when the non-encrypted file is destroyed that the encrypted version of the file is somewhat secure. This form of encryption is also quite suitable when an encrypted version of the file is sent by electronic mail.

Another form of file security offers a much more transparent means for encrypting files that are stored on a computer readable medium. Typically, this type of file security is integrated into an operating system. It should be appreciated that an operating system typically includes a file system. The file system is responsible for managing files that are stored on a computer readable medium. In most instances, the computer readable medium is organized into a volume by a volume manager. The volume manager is responsible for managing the available storage provided by a computer readable medium. As such, the file system relies on the volume manager whenever it needs access to storage capacity provided by the computer readable medium. As such, a file system is organized (i.e. mounted) on top of a volume. The volume becomes the file system boundary in terms of available blocks and file system size.

In one typical system, the volume manager creates an encrypted volume. The volume manager then provides encryption at the volume level. As such, files that are created and managed in an encrypted volume are less susceptible to compromise because all of the data in the volume is encrypted. One problem with such volume level encryption is that all of the data stored in the volume is typically protected by only one encryption key. In the event that the one encryption key is somehow compromised, the security provided by the otherwise encrypted volume is lost.

BRIEF DESCRIPTION OF THE DRAWINGS

Several alternative embodiments will hereinafter be described in conjunction with the appended drawings and figures, wherein like numerals denote like elements, and in which:

FIG. 13 is a pictorial representation of one example embodiment of a volume key table;

FIG. 14 is a pictorial representation of one example embodiment of a file key table;

FIG. 15 is a pictorial diagram that illustrates the structure of several example embodiments of a temporal key table;

DETAILED DESCRIPTION

Figure 1A:
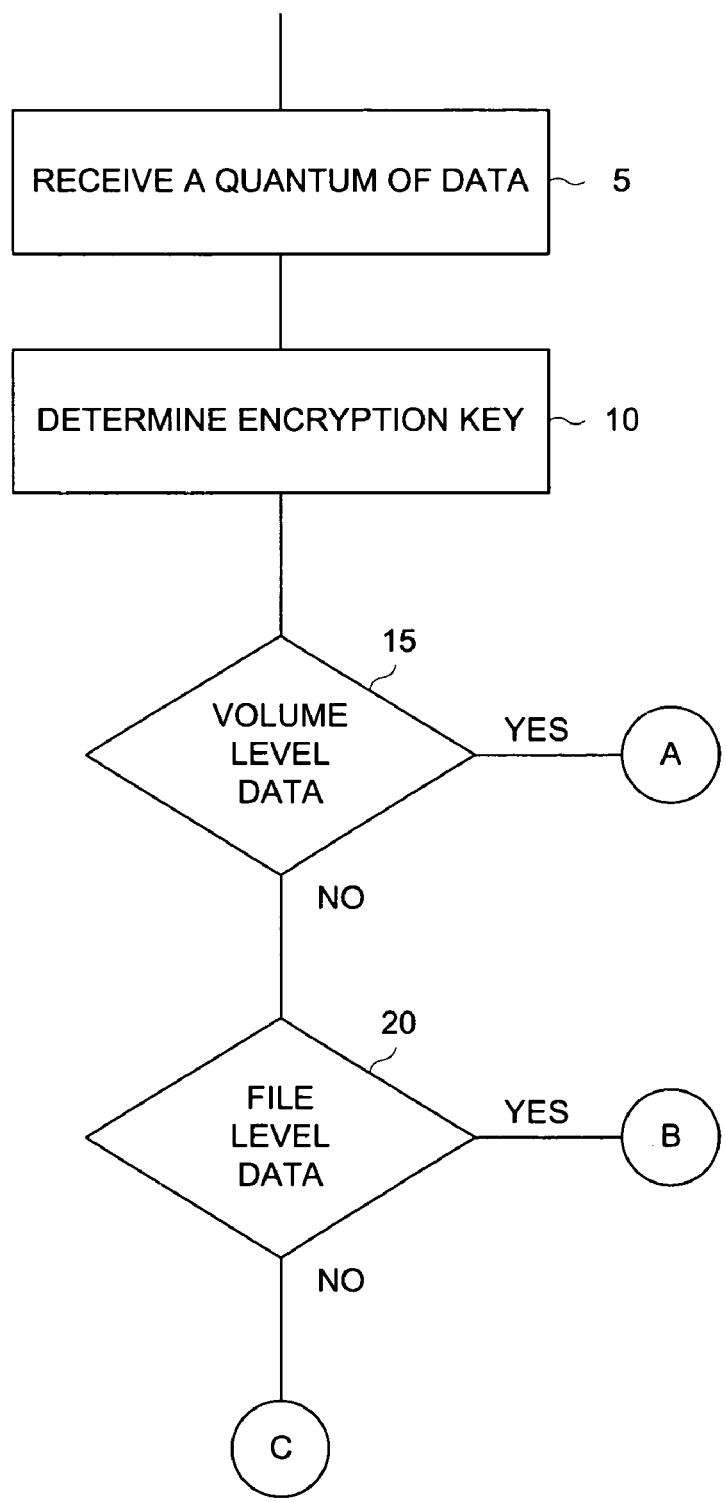
FIGS. 1A and 1B collectively comprise a flow diagram that depicts one example method for managing encrypted data on a computer readable medium.
Figure 1B:
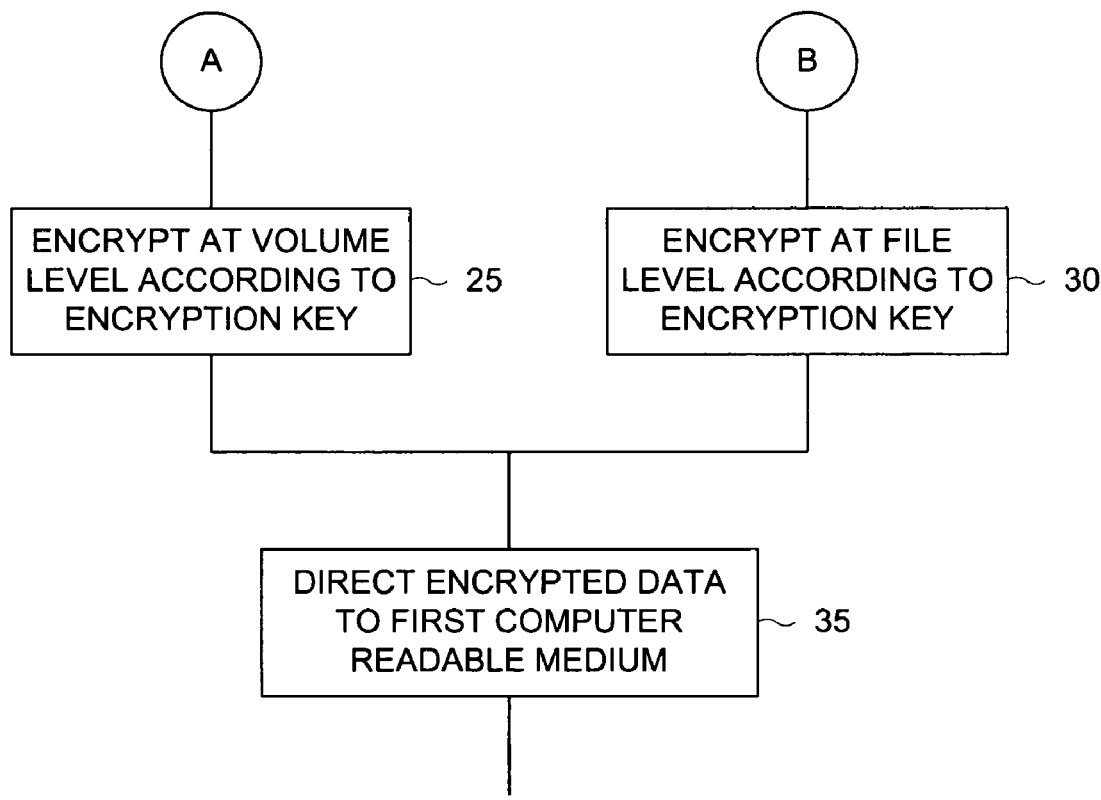

FIGS. 1A and 1B collectively comprise a flow diagram that depicts one example method for managing encrypted data on a computer readable medium. According to this example method, encrypted data is managed on a computer readable medium by receiving a quantum of data (step 5). Once the quantum of data has been received, an encryption key is determined for the quantum of data (step 10). It should be appreciated that data to be managed in an encrypted manner on computer readable medium comprises at least one of volume level data and file level data. The quantum of data is encrypted according to an encryption key at a volume level (step 25) when the quantum of data comprises volume level data (step 15). The quantum of data is encrypted at a file level (step 30) when the quantum of data comprises file level data (step 20). The encrypted data is then directed to a first computer readable medium (step 35).

Figure 2:
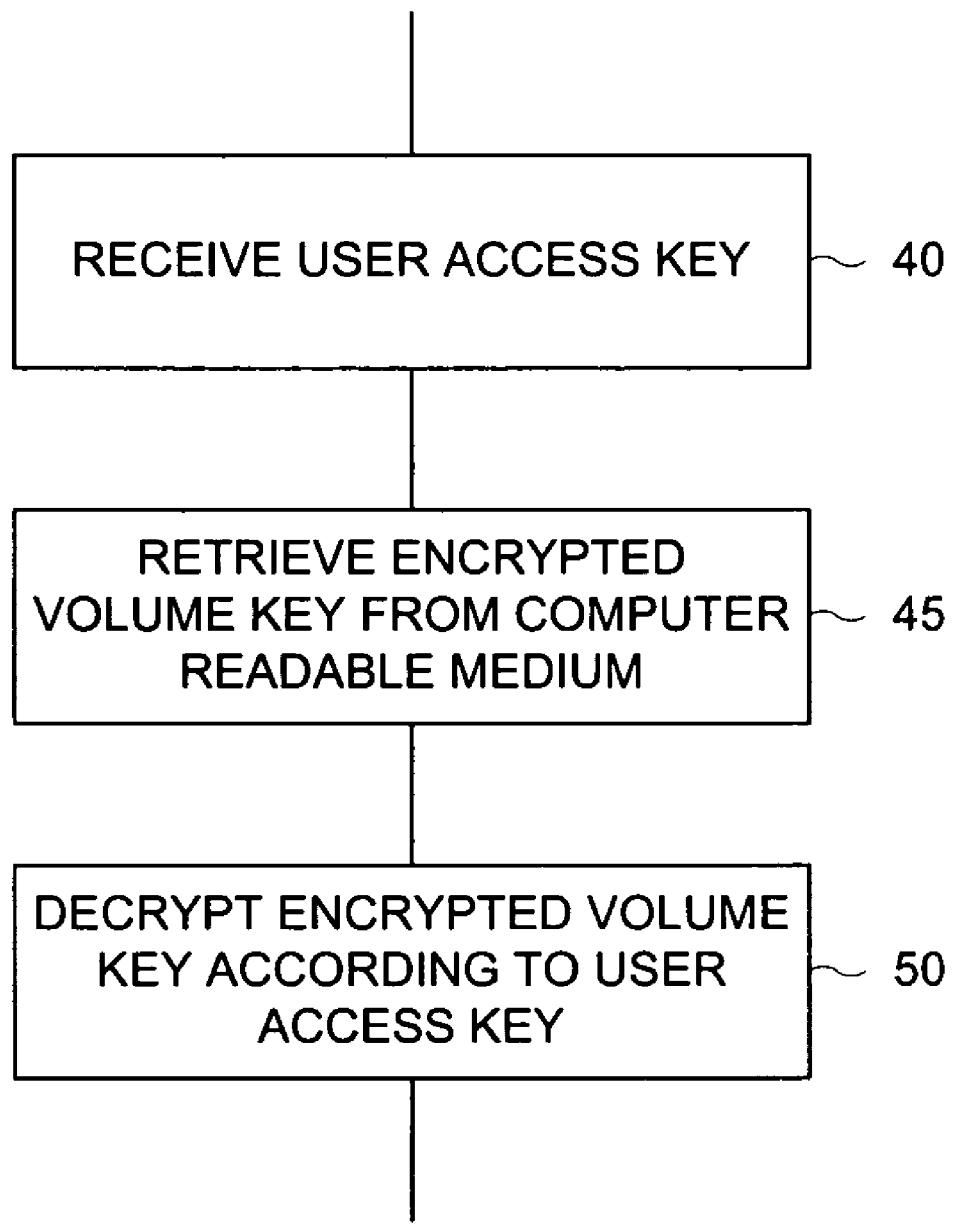
FIG. 2 is a flow diagram that depicts one alternative method for determining an encryption key for a quantum of volume data.

FIG. 2 is a flow diagram that depicts one alternative method for determining an encryption key for a quantum of volume data. According to this alternative example method, determining an encryption key comprises receiving a user access key (step 40), retrieving an encrypted volume key from a computer readable medium (step 45) and then decrypting the encrypted volume key according to the user access key (step 50). According to one illustrative use case, a user access key is received from a user application. According to yet another illustrative use case, a user access key is received from an operating system process. It should be appreciated that any process operating in a computer environment that needs to store and encrypt a quantum of data on a computer readable medium can be the source of a user access key. Typically, a computer readable medium is used to store an encrypted volume key, which is then accessible to various users supported by a computer system. According to one variation of the present method, the user access key received from an application or other process executing in a computer environment comprises a private-key, which can be used to decrypt the encrypted volume key. Once the encrypted volume key is decrypted, it can be used to access an encrypted volume stored on computer readable medium.

Figure 3:
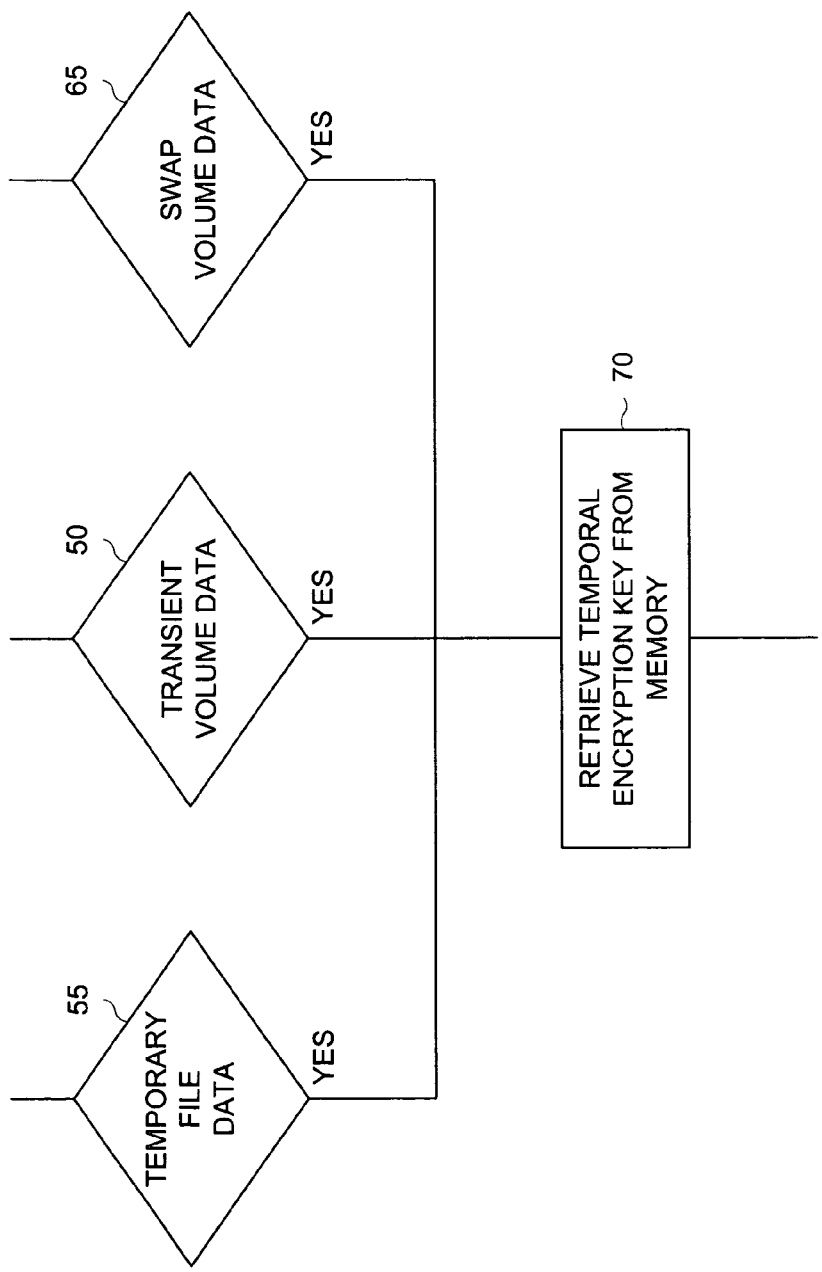
FIG. 3 is a flow diagram that depicts an alternative method for determining an encryption key for temporal data stored on a computer readable medium.

FIG. 3 is a flow diagram that depicts an alternative method for determining an encryption key for temporal data stored on a computer readable medium. In some cases, a quantum of data stored on computer readable medium is temporal in nature. That is to say, the data may not need to survive a power-down or reboot sequence of a computer execution environment. According to this alternative method, a temporal key is retrieved from memory (step 70) when the quantum of data comprises data from a temporary file (step 55), the quantum of data comprises a transient volume stored on computer readable medium (step 60) or the quantum of data comprises information stored on a swap volume (step 65). Accordingly, when a quantum of data comprises at least one of a quantum of temporary file data, a quantum of transient volume data and a quantum of swap volume data, an encryption key is retrieved from memory, wherein the encryption key is a temporal encryption key. As such, loss of the temporal encryption key through the course of a power-down or reboot sequence of the computer execution environment will result in an inability to decrypt the temporal data stored on a computer readable medium.

Figure 4:
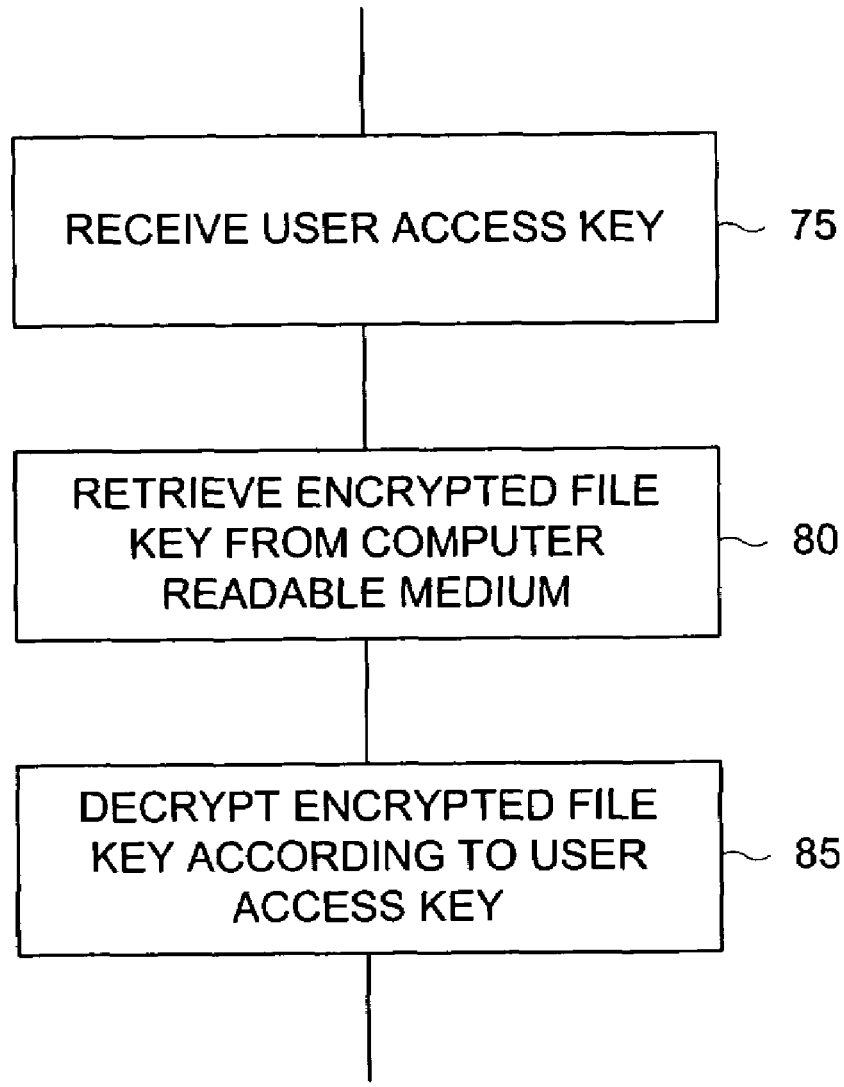
FIG. 4 is a flow diagram that depicts one alternative method for determining an encryption key for a quantum of file data.

FIG. 4 is a flow diagram that depicts one alternative method for determining an encryption key for a quantum of file data. According to this alternative method, an encryption key for a quantum of file data is determined by receiving a user access key (step 75), retrieving an encrypted file key from a computer readable medium (step 80) and then decrypting the encrypted file key according to the user access key (step 85). It should be appreciated that the file key that is encrypted and stored on computer readable medium may be used by multiple users. As such, each of the multiple users will need to provide a user access key in order to decrypt the encrypted file key stored on the computer readable medium. According to one variation of the present method, the user access key provided by a user application (or an operating system process) comprises a private-key that can be used to decrypt an encrypted file key stored on computer readable medium.

Figure 5:
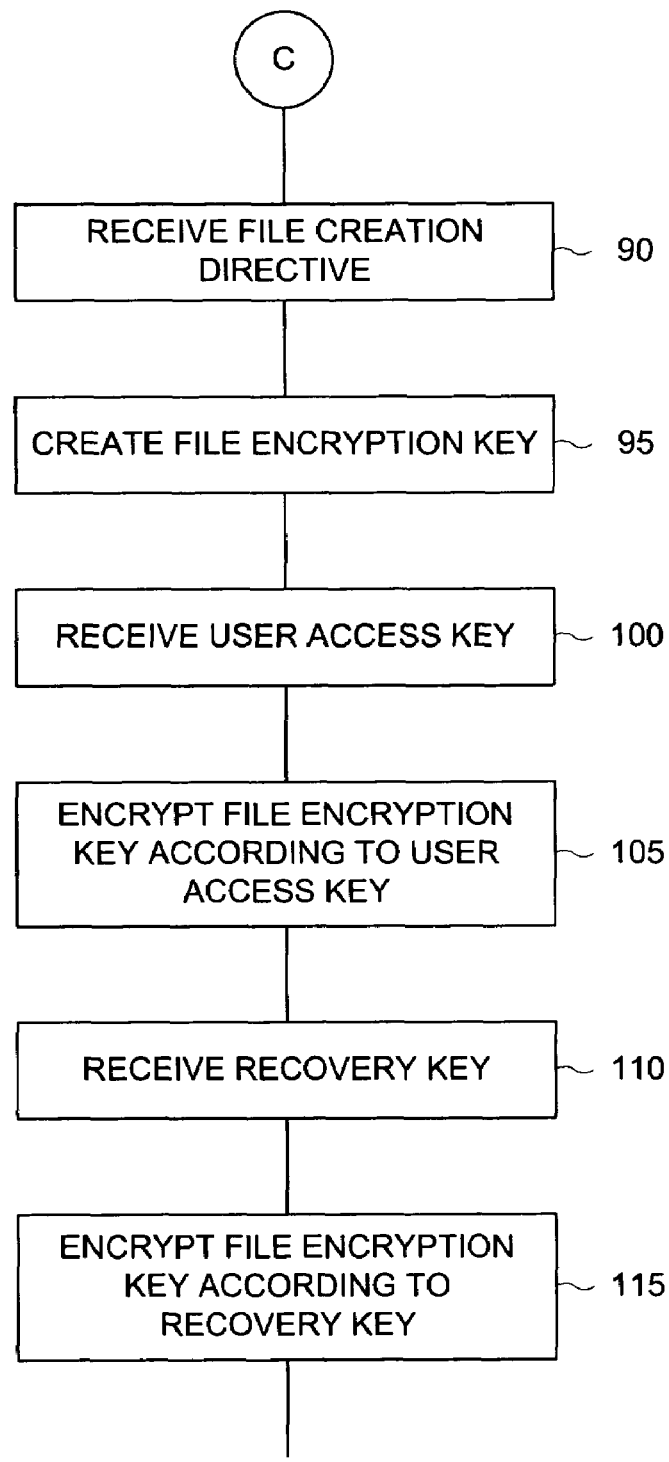
FIG. 5 is a flow diagram that depicts one example method for creating a file, wherein data in the file is to be encrypted.

FIG. 5 is a flow diagram that depicts one example method for creating a file, wherein data in the file is to be encrypted. According to this variation of the present method, a method for managing encrypted data on a computer readable medium further comprises receiving a file creation directive (step 90). Typically, when a user application or operating system process needs to store data in a file, the process that needs to store data typically needs to create a file to store said data. Accordingly, a file creation directive results in the creation of a file, which is typically managed under a file system. As such, when the file is created, a file encryption key is also generated (step 95). According to this variation of the present method, a user access key is also received (step 100) along with the file creation directive. The file encryption key created for the file is then itself encrypted according to the user access key (step 105). According to yet another variation of the present method, a recovery key is also received (step 110). The recovery key, according to one illustrative use case, is received from an operating system file management process. An operating system file management process may provide a recovery key as a means for subsequent access to the encrypted file encryption key in the event that the user process, in some manner, loses the original user access key. Accordingly, the file encryption key created for the newly created file is encrypted according to the recovery key (step 115).

Figure 6:
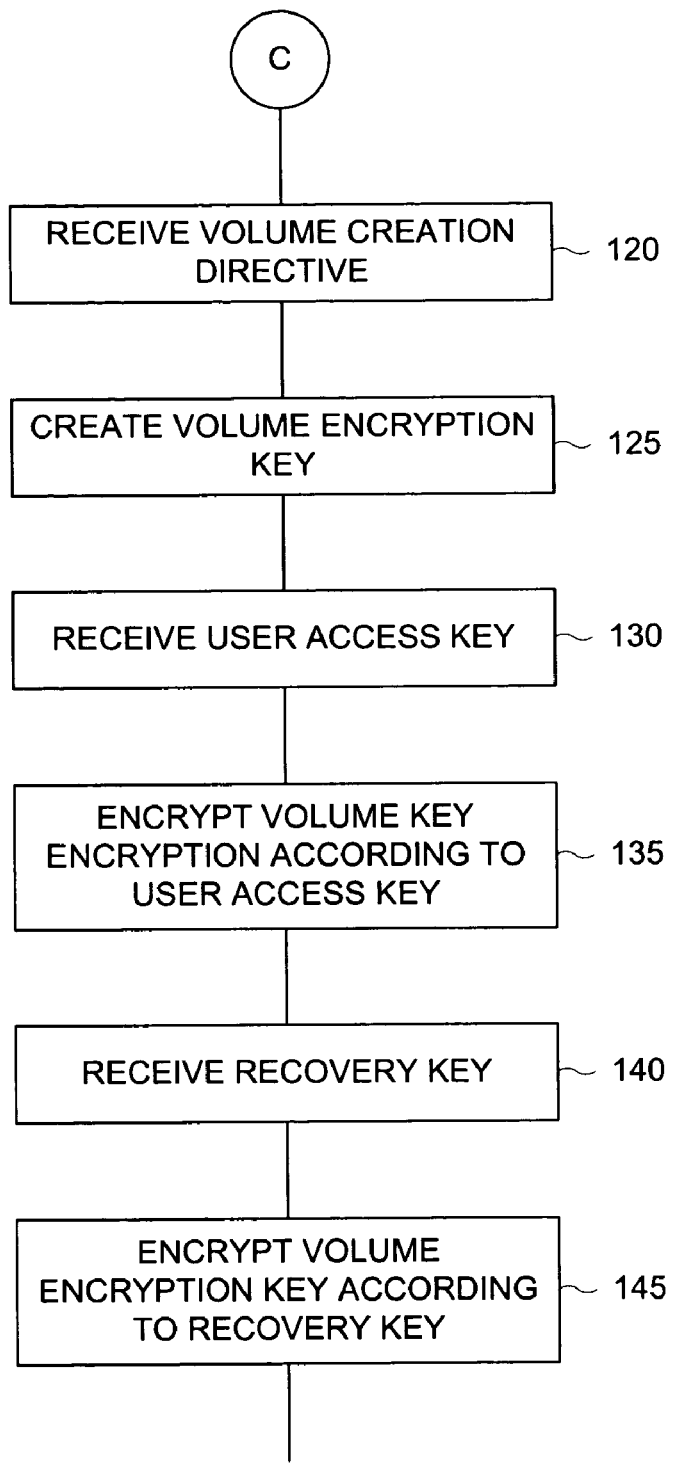
FIG. 6 is a flow diagram that depicts one example method for creating a volume, wherein data in the volume is to be encrypted.

FIG. 6 is a flow diagram that depicts one example method for creating a volume, wherein data in the volume is to be encrypted. Typically, a user process or an operating system process is engaged to create a volume of information on a computer readable medium. Accordingly, this variation of the present method provides for the creation of a volume on computer readable medium, where the volume of information is to be managed in an encrypted manner. Accordingly, this variation of the present method for managing encrypted data on a computer readable medium further comprises receiving a volume creation directive (step 120). In response to receiving the volume creation directive, a new volume is typically created. Also, a volume encryption key is created (step 125) for the newly created volume. Likewise, a user access key is also received (step 130). Typically, the user access key is received from an application process or an operating system process that initiated the creation of a volume. Using the user access key, the volume encryption key is encrypted (step 135). As such, the volume encryption key is typically stored in a computer readable medium, from whence it may be retrieved at a subsequent time. In order to prevent a catastrophic loss of data, which may occur in the event that the user process inadvertently loses the user access key provided according to the present method, one variation of the present method provides for receiving one or more recovery keys (step 140). The volume encryption key created for the newly created volume is then encrypted according to the recovery key (step 145).

Figure 7:
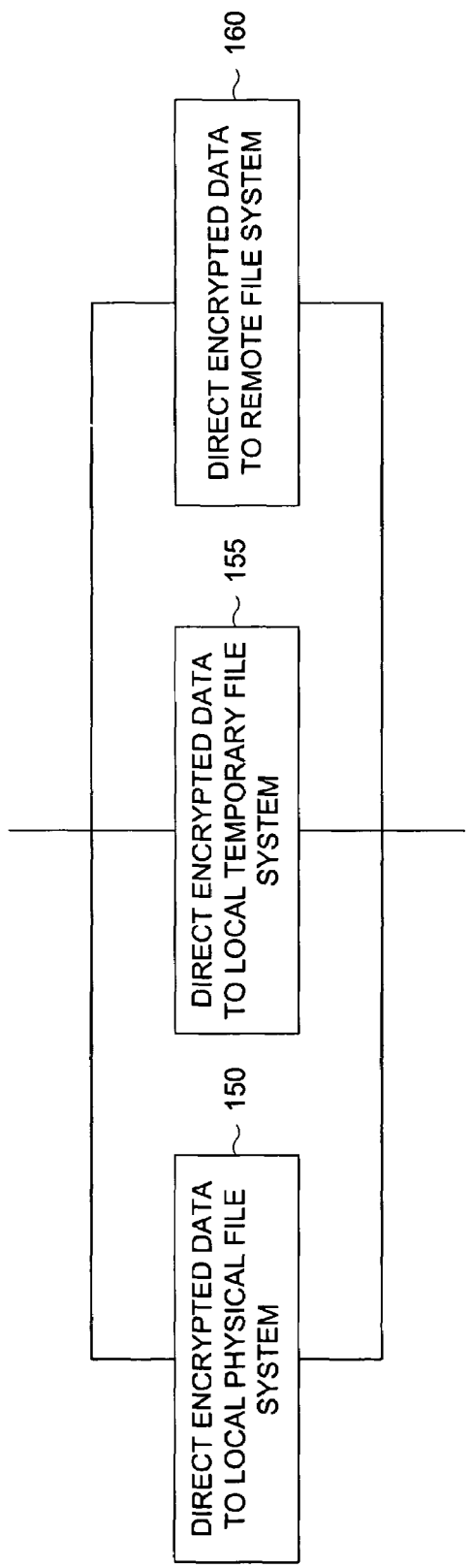
FIG. 7 is a flow diagram that depicts alternative example methods for directing encrypted data to a first computer readable medium.

FIG. 7 is a flow diagram that depicts alternative example methods for directing encrypted data to a first computer readable medium. According to one variation of the present method, the encrypted data is directed to a first computer readable medium by directing the data to at least one of a local physical file system (step 150), a local temporary file system (step 155) and a remote file system (step 160). Accordingly, the present method can be applied where data is to be stored either locally on a physical storage device (e.g. a hard drive) on a particular computer, in random access memory as a temporary file managed by a local temporary file system or on a remote file system, e.g., a network file system ("NFS"). It should be appreciated that these examples of computer readable medium to which encrypted data can be directed are presented here merely to illustrate the present method and are not intended to limit the scope of the claims appended hereto.

Figure 8A:
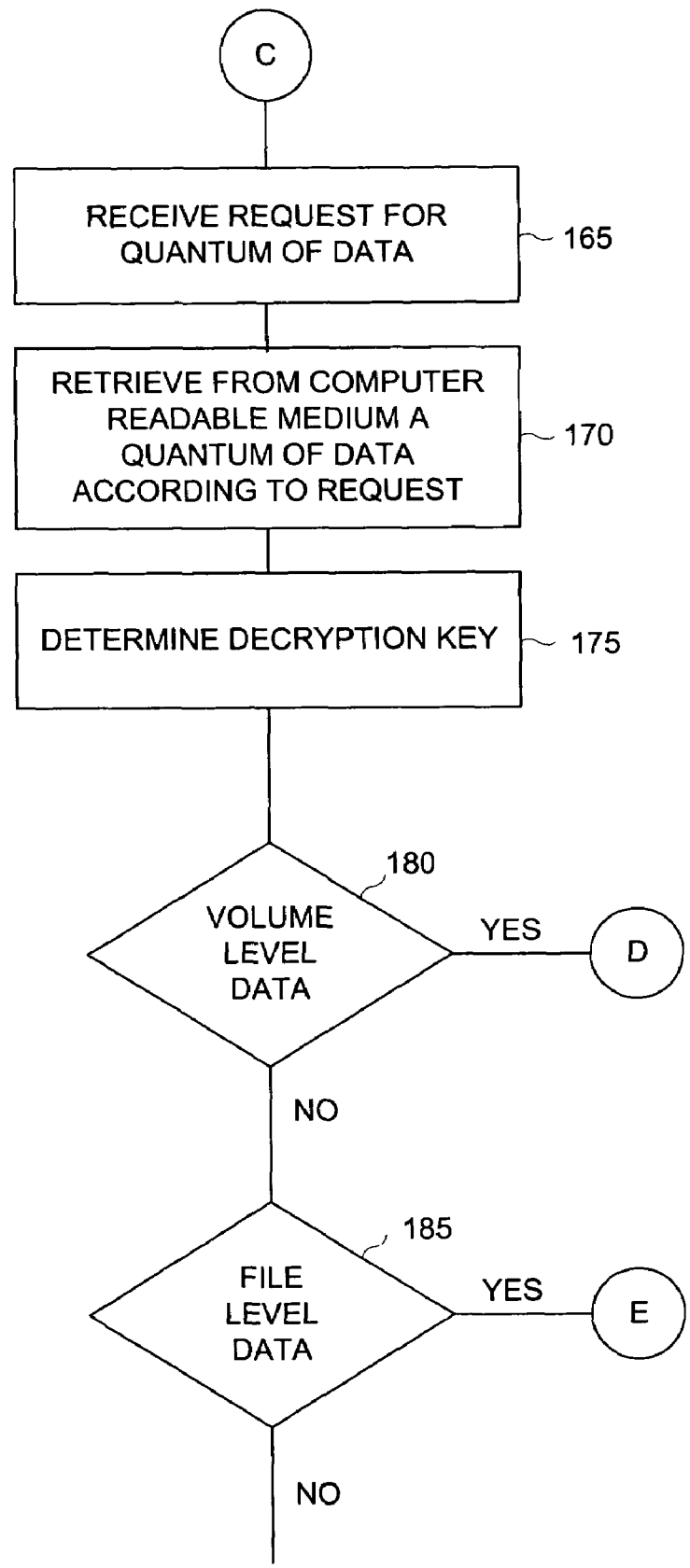
FIGS. 8A and 8B collectively form a flow diagram that depicts one variation of the present method that accommodates retrieval of encrypted data from a computer readable medium.
Figure 8B:
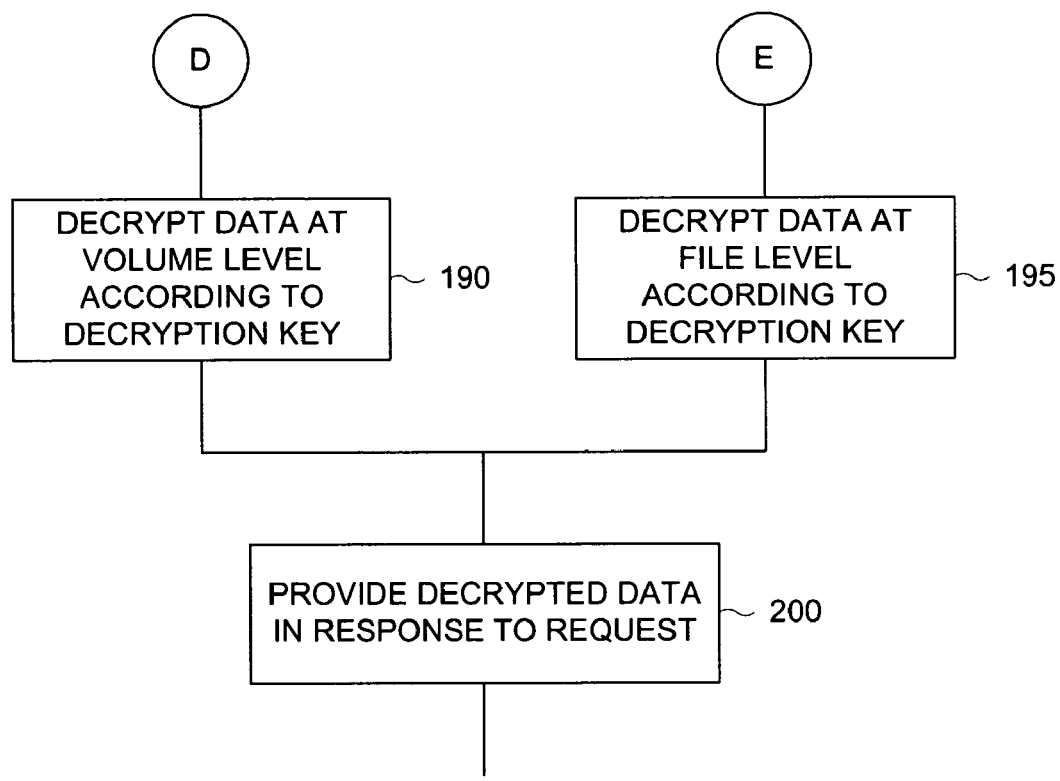

FIGS. 8A and 8B collectively form a flow diagram that depicts one variation of the present method that accommodates retrieval of encrypted data from a computer readable medium. Once information is stored on a computer readable medium, either in volume form or file form, one variation of the present method provides for receiving a request for a quantum of data (step 165). As such, when the request for a quantum of data is received, the quantum of data is retrieved from a computer readable medium (step 170). It should be appreciated that the quantum of data retrieved from the computer readable medium is retrieved in an encrypted form. Once the encrypted data is retrieved from the computer readable medium, a decryption key is then determined (step 175). The decryption key is used to decrypt the quantum of data retrieved from the computer readable medium. In the event that the quantum of data comprises volume level data (step 180), the quantum of encrypted data retrieved from the computer readable medium is decrypted at a volume level (step 190). In the event that the data retrieved from the computer readable medium comprises file level data (step 185), the quantum of data retrieved from the computer readable medium is decrypted at a file level (step 195). It should be appreciated that the data is decrypted according to the decryption key determined for the quantum of data. Once decrypted, the decrypted data is then provided in response to the request for the quantum of data (step 200).

Figure 9:
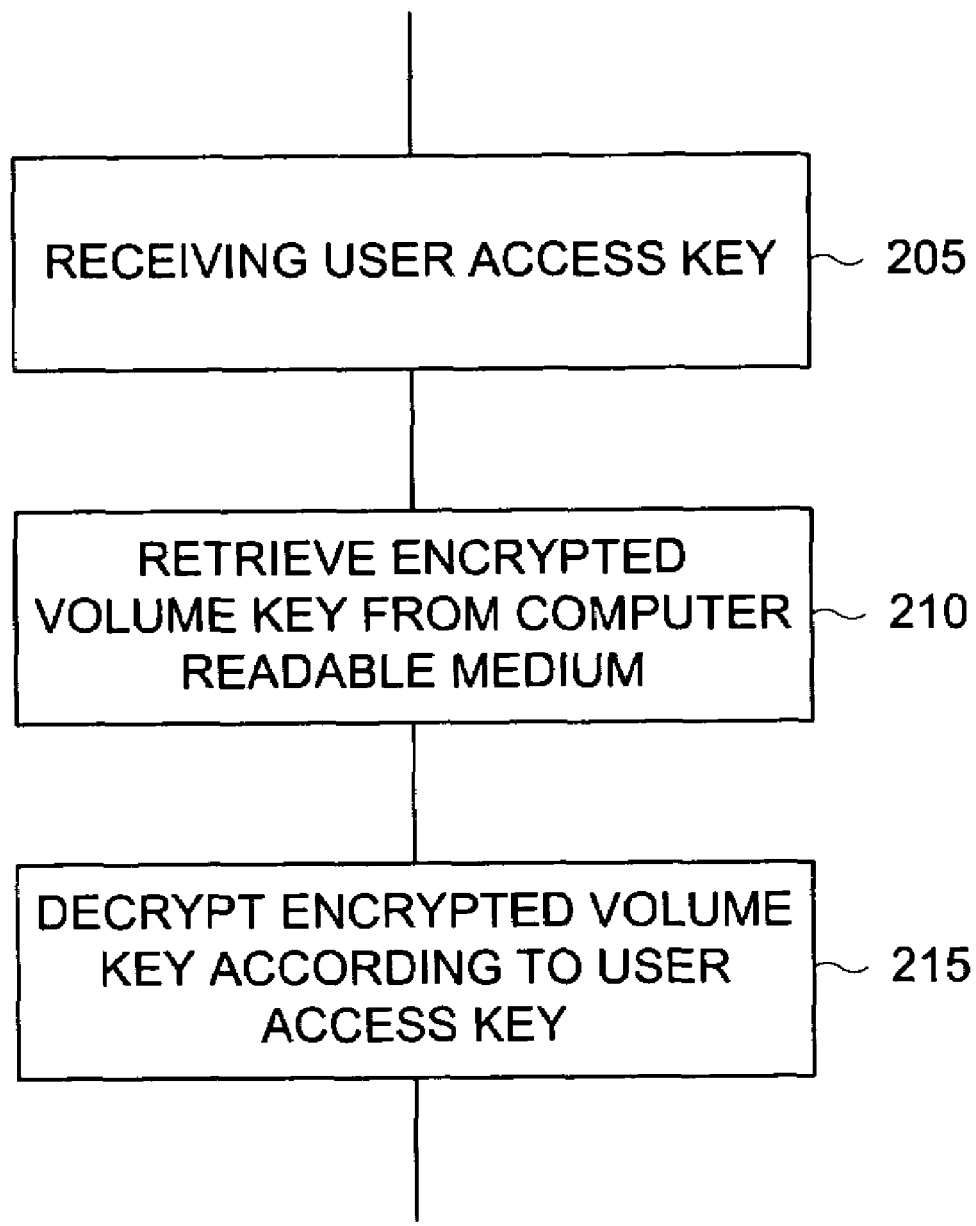
FIG. 9 is a flow diagram that depicts one example method for determining a decryption key for data stored in a volume.

FIG. 9 is a flow diagram that depicts one example method for determining a decryption key for data stored in a volume. According to this example method, determining a decryption key comprises receiving a user access key (step 205). An encrypted volume key is then retrieved from computer readable medium (step 210). The encrypted volume key that is retrieved from computer readable medium is then decrypted using the received user access key (step 215). It should be appreciated that the encrypted volume key comprises a decryption key which corresponds to a particular encryption key and that the decryption key and the encryption key, according to one variation of the present method comprises the same key. Typically, the encrypted volume key is encrypted using the user access key when the volume is initially created, commensurate with the teachings presented herein.

Figure 10:
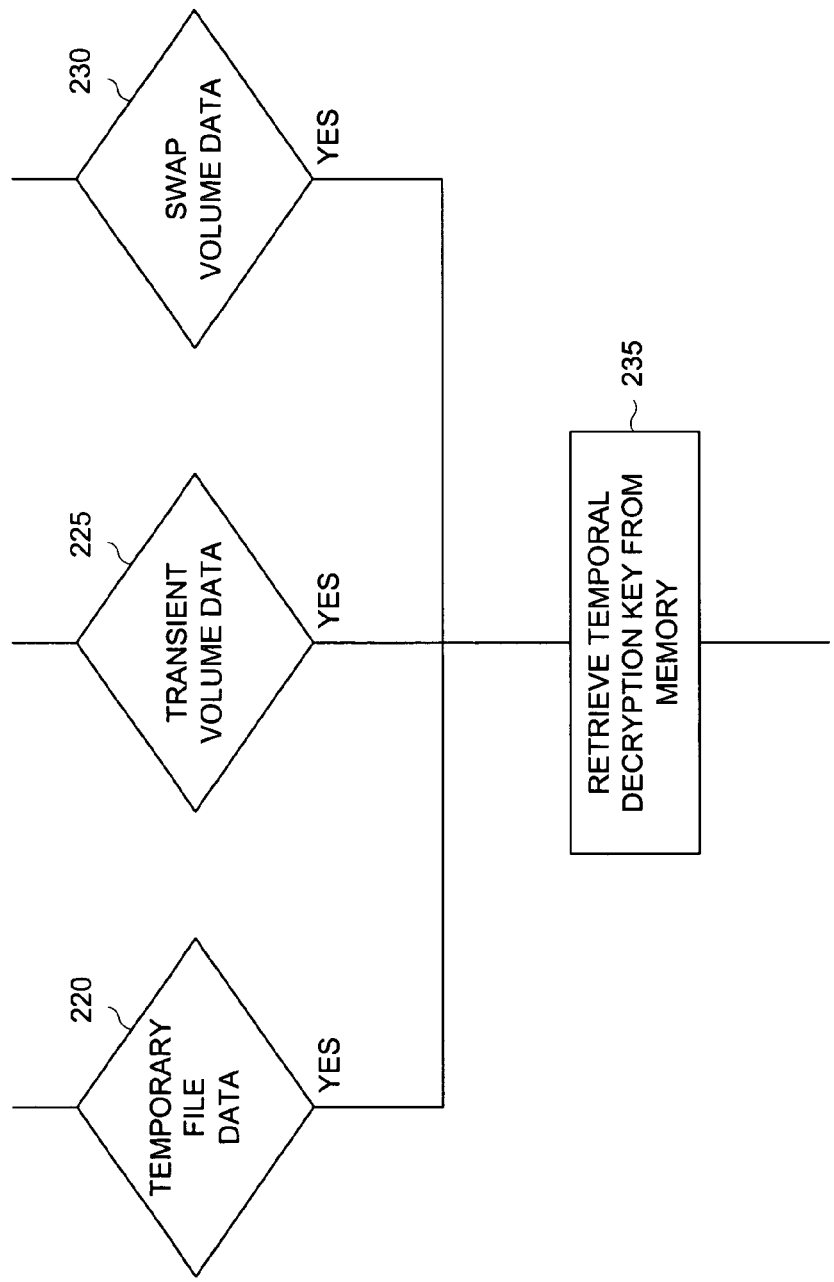
FIG. 10 is a flow diagram that depicts one example method for determining a decryption key for data that is stored in a transient volume.

FIG. 10 is a flow diagram that depicts one example method for determining a decryption key for data that is stored in a transient volume. It should be appreciated that in some cases data stored in a volume or in a file is temporal in nature. Accordingly, when a quantum of data comprises data from a temporary file (step 220) or when a quantum of data comprises data stored in a transient volume (step 225) or when a quantum of data comprises data stored in a swap volume (step 230), a temporal decryption key is retrieved from a memory (step 235). It should be appreciated that a temporal decryption key is a key that is stored in a volatile memory, which typically does not survive a power-down or reboot of a computer execution environment.

Figure 11:
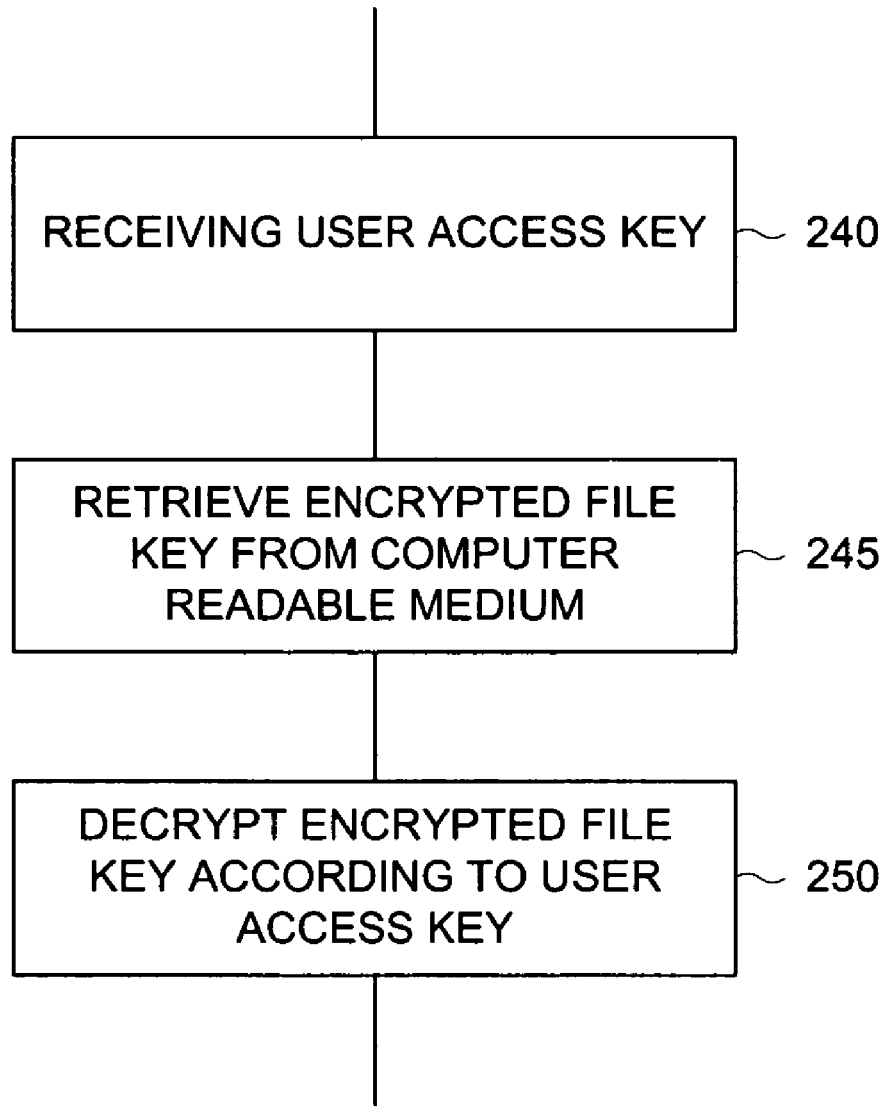
FIG. 11 is a flow diagram that depicts one example alternative method for determining a decryption key for data stored in a file.

FIG. 11 is a flow diagram that depicts one example alternative method for determining a decryption key for data stored in a file. According to this alternative method, determining a decryption key for data stored in a file is accomplished by receiving a user access key (step 240). Once the user access key is received, an encrypted file key is retrieved from computer readable medium (step 245). The encrypted file key is decrypted according to the received user access key (step 250) in order to yield a decrypted decryption key for the file.

Figure 12:
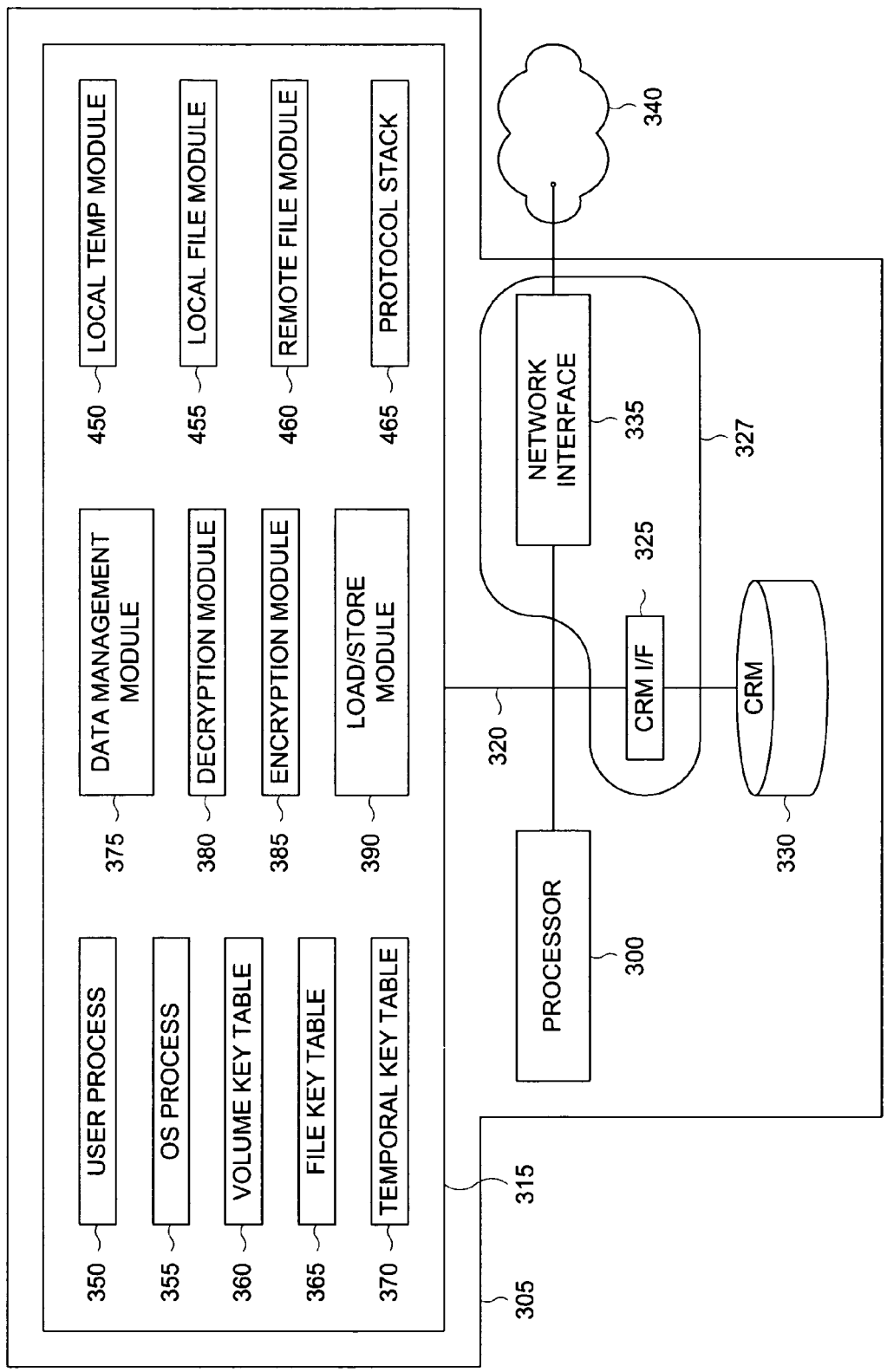
FIG. 12 is a block diagram that depicts several alternative embodiments of a system for managing data on a computer readable medium in an encrypted manner.

FIG. 12 is a block diagram that depicts several alternative embodiments of a system for managing data on a computer readable medium in an encrypted manner. According to one alternative embodiment, a system for managing data on a computer readable medium in an encrypted manner 305 comprises a processor 300, a memory 315, and a media interface unit 327. According to one alternative embodiment, the media interface unit 327 comprises a computer readable medium interface (I/F) controller 325. In yet another alternative embodiment, the media interface unit 327 comprises a network interface 335. It should be appreciated that the processor 300 is capable of executing an instruction sequence. It should also be appreciated that the memory 315 is capable of storing one or more instruction sequences and is further capable of storing data. The media interface unit is capable of directing data to and retrieving data from a computer readable medium, wherein computer readable medium includes, but is not limited to at least one of random access memory, read-only memory (ROM), compact disk ROM (CD ROM), floppy disks, hard disk drives, magnetic tape and digital versatile disks (DVD).

Also included in various example alternative embodiments of the system 305 are one or more functional modules. A functional module is typically embodied as an instruction sequence. An instruction sequence that implements a functional module, according to one alternative embodiment, is stored in the memory 315. The reader is advised that the term "minimally causes the processor" and variants thereof is intended to serve as an open-ended enumeration of functions performed by the processor 300 as it executes a particular functional module (i.e. instruction sequence). As such, an embodiment where a particular functional module causes the processor 300 to perform functions in addition to those defined in the appended claims is to be included in the scope of the claims appended hereto.

The functional modules (i.e. their corresponding instruction sequences) described thus far that enable managing data on a computer readable medium in an encrypted manner according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of managing data on computer readable medium in an encrypted manner according to the techniques and teachings presented herein. Accordingly, the claims appended hereto are to include such computer readable medium imparted with such instruction sequences that enable execution of the present method and all of the teachings herein described.

According to one alternative embodiment, a system for managing data on a computer readable medium comprises several functional modules which are stored in the memory including a data management module 375, an encryption module 385 and a load-store module 390. The memory 315 of this alternative embodiment is used to store at least one of a volume key table 360, a file key table 365 and a temporal key table 370.

FIG. 13 is a pictorial representation of one example embodiment of a volume key table. According to this example embodiment, a volume key table 360 includes one or more records, wherein each record includes a volume identifier (ID) field 395 and an encrypted volume key field 410. According to one alternative embodiment, individual records in the volume key table 360 further comprise a user identifier (ID) field 400. According to yet another alternative embodiment the individual records in the volume key table 360 further comprise a user access key field 405.

FIG. 14 is a pictorial representation of one example embodiment of a file key table. According to this example embodiment, a file key table 365 includes one or more records, wherein each record includes a file identifier (ID) field 415 and an encrypted file key field 430. According to one alternative embodiment, individual records in the file key table 365 further comprise a user identifier (ID) field 420. According to yet another alternative embodiment the individual records in the file key table 365 further comprise a user access key field 420.

FIG. 15 is a pictorial diagram that illustrates the structure of several example embodiments of a temporal key table. According to one example embodiment, a temporal key table 370 includes one or more records, wherein each record comprises a volume identifier field 435 and a temporal key field 445. According to yet another alternative embodiment, the temporal key table 370 includes records that comprise a file identifier field 440 and a temporal key field 445.

Figure 16:
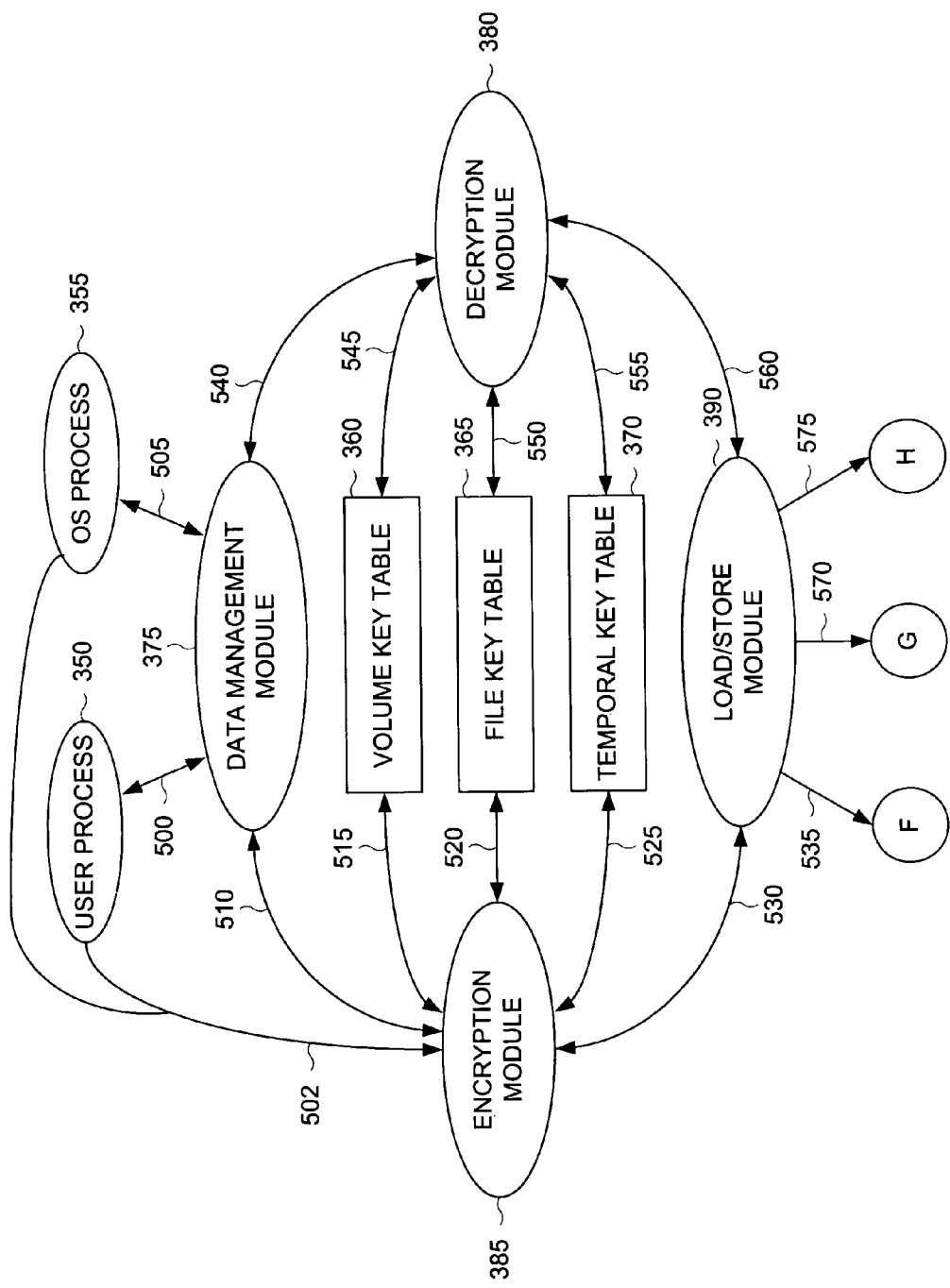
FIGS. 16 and 17 collectively comprise a data flow diagram that depicts the internal operation of several alternative embodiments of a system for managing encrypted data on computer readable medium.
Figure 17:
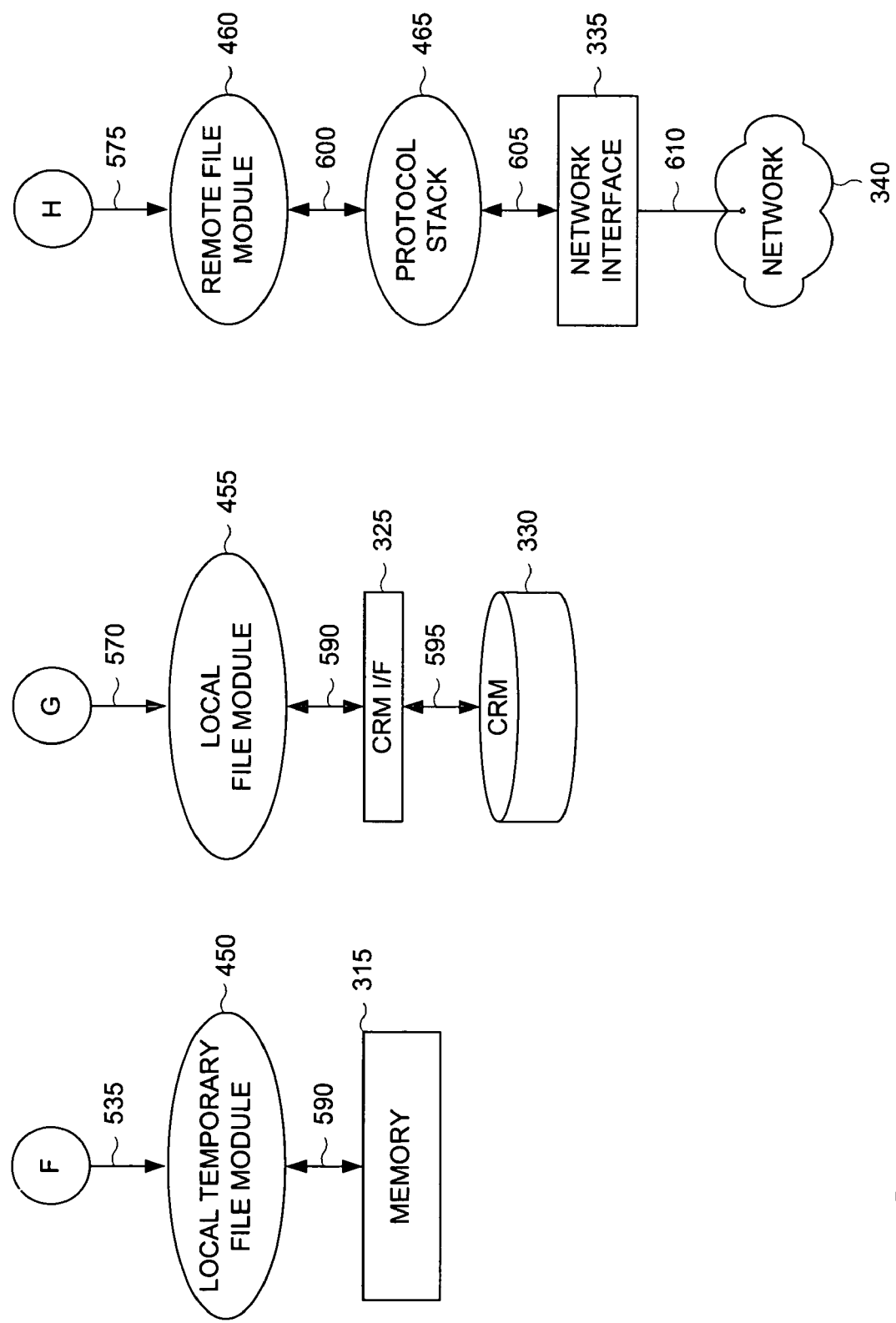

FIGS. 16 and 17 collectively comprise a data flow diagram that depicts the internal operation of several alternative example embodiments of a system for managing encrypted data on computer readable medium. In operation, the processor 300 executes a process that requires the services of an encrypted data management system. As such, the processor 300 executes at least one of a user process 350 and an operating system process 355. It should be appreciated that the user process 350 and the operating system process 355 are typically stored in the memory 315. As the executing process (e.g. a user process 350 or an operating system process 355) needs to interact with a system for managing data on a computer readable medium in an encrypted manner, the executing process conveys (500, 505) a quantum of data to the data management module 375. Typically, this quantum of data needs to be stored on computer readable medium in an encrypted manner.

As the processor 300 executes the data management module 375, the data management module 375 minimally causes the processor to receive a quantum of data from the executing process. The data management module 375 then directs 510 the quantum of data to the encryption module 385. The encryption module 385, when executed by the processor, minimally causes the processor 300 to determine an encryption key for the received quantum of data, encrypt the quantum of data at a volume level when the quantum of data comprises volume data and encrypt the quantum of data at a file level when the quantum of data comprises file data. It should be appreciated that whenever the encryption module 385 minimally causes the processor to encrypt a quantum of data, whether at a file level or a volume level, the encryption module 375 minimally causes the processor 300 to perform said encryption according to the determined encryption key.

Once the quantum of data is encrypted by the processor 300 as it executes the encryption module 385, the quantum of encrypted data is then directed 530 to the load-store module 390. The load-store module 390, when executed by the processor 300, minimally causes the processor 300 to direct the quantum of encrypted data to a media driver module. It should be appreciated that the media driver module, when executed by the processor 300, causes the processor to direct the encrypted data to a particular type of medium commensurate with the media driver module which is executed.

According to one alternative embodiment, the encryption module 385 causes the processor to determine an encryption key by minimally causing the processor 300 to receive 502 a user access key from the executing process. Typically, the user access key comprises a private-key that can be used to decrypt an encrypted volume key or an encrypted file key. It should be appreciated that the encryption module 385, when executed by the processor 300, causes the processor 300 to determine the type of data received from the executing process (350, 355).

When the processor 300 determines that the quantum of data received from the executing process (350, 355) comprises volume data, the encryption module 385 causes the processor to retrieve an encrypted volume key from a volume key table 360. According to one alternative embodiment, the encryption module 385 causes the processor 300 to retrieve an encrypted volume key from an encrypted volume key field 410 included in a particular record stored in the volume key table 360. According to one alternative embodiment, a volume identifier and a user identifier are also received from the executing process. The volume identifier received from the executing process is used by the processor 300 to select a particular record stored in the volume key table 360. In conjunction with the volume identifier, this alternative embodiment of an encryption module 385 also causes the processor 300 to select a particular record in the volume key table 360 (volume ID field 395). In conjunction with the volume identifier, this alternative embodiment of an encryption module 385 also causes the processor 300 to select a particular record in the volume key table 360 according to the user identifier (user ID field 400). In yet another alternative embodiment, encryption module 385 further minimally causes the processor 300 to store 515 a received user access key into a user access key field 405 included in the selected record stored in the volume key table 360. The processor 300 will then retrieve an encrypted volume key from an encrypted volume key field 410 included in the selected record stored in the volume key table 360. Typically, the volume key table 360 is stored in the memory 315, but is cached back to a more permanent computer readable medium, for example a hard drive. This alternative embodiment of an encryption module 385 further minimally causes the processor 300 to use the retrieved user access key to decrypt the encrypted volume key. The decrypted volume key is then used to encrypt the quantum of data received from the executing process (350, 355).

When the processor 300 determines that the quantum of data received from the executing process (350, 305) comprises file data, the encryption module 385 causes the processor to retrieve an encrypted file key from a file key table 365. According to one alternative embodiment, the encryption module 385 causes the processor 300 to retrieve an encrypted file key from an encrypted file key field 430 included in a particular record stored in the file key table 365. According to one alternative embodiment, a file identifier and a user identifier are also received from the executing process. The file identifier received from the executing process is used by the processor 300 to select a particular record stored in the file key table 365 (file ID field 415). In conjunction with the file identifier, this alternative embodiment of an encryption module 385 also causes the processor 300 to select a particular record in the file key table 365 according to the user identifier 420 (user ID field 420). In yet another alternative embodiment, the encryption module 385 further minimally causes the processor 300 to store 520 the received user access key into a user access key field 425 included in the selected record stored in the file key table 365. The processor 300 will then retrieve an encrypted file key from an encrypted file key field 430 included in the selected record stored in the file key table 365. Typically, the file key table 365 is stored in the memory 315, but is cached back to a more permanent computer readable medium, for example a hard drive. This alternative embodiment of an encryption module 385 further minimally causes the processor 300 to use the retrieved user access key to decrypt the encrypted file key. The decrypted file key is then used to encrypt the quantum of data received from the executing process (350, 355).

In some cases, the data to be encrypted comprises temporal data. In this situation, the processor 300, as it executes the encryption module 385, is minimally caused to determine when the data received from the executing process (350, 355) comprises temporal data. In the event that the processor 300 determines that the data received from the executing process comprises at least one of temporary file data, transient volume data and swap volume data, the processor 300 will further minimally be caused to retrieve 525 a temporal key from a temporal key table 370. In the event that the processor determines that the data received from the executing process comprises temporary file data, the processor uses a file identifier to access a temporal key from a temporal key field 445 included in a particular record stored in the temporal key table 370. It should be appreciated that the file identifier is used by the processor to select a particular record according to a file identifier field 440. In the event the processor 300 determines that the data received from the executing process comprises either data from a transient volume or data from a swap volume, the processor 300, as it continues to execute this alternative embodiment of an encryption module 385, will receive a volume identifier from the executing process. The processor 300 will then use the volume identifier to select the record in the temporal key table 370 according to a volume identifier field 435. As such, a temporal key is retrieved from a temporal key field 445 included in the selected record stored in the temporal key table 370.

When an executing process (350, 355) needs to create a new file on computer readable medium, the encryption module 385 further minimally causes the processor 300 to receive a file creation directive from the executing process (350, 355). In response, the encryption module 385 further minimally causes the processor 300 to create a file encryption key. The processor 300 is also further minimally caused to receive a user access key from the executing process (350, 355). Using the user access key, the encryption module 385 then encrypts the newly created file encryption key and stores 520 the newly encrypted file encryption key in the file key table 365. It should be appreciated that the processor 300, as it continues to execute this alternative embodiment of an encryption module 385, will store the encrypted file key along with a file identifier and a user identifier in a particular record in the file key table 365. It should be noted that a record in the file key table is used to store the file key, the file identifier and a user identifier and that such record includes fields for storing the file identifier (file ID field 415), the user identifier (user ID field 420) and the encrypted file key (encrypted file key field 430).

According to yet another alternative embodiment, the encryption module 385 further minimally causes the processor 300 to generate a recovery key, encrypt the file encryption key according to the recovery key and store the encrypted file encryption key in the file key table 365. In this situation, the encryption module 385 further minimally causes the processor 300 to store the encrypted file key in the encrypted file key field 430 of a record stored in the file key table 365. The processor 300 is further minimally caused to store a file identifier in the file ID field 415 of that particular record. The processor 300 is also further minimally caused to store the recovery key in the user access key field 425. The processor 300, according to this alternative embodiment, is further minimally caused to store a user identifier to the user identifier field 420. Typically, the encryption module 385 operates as a protected process in an operating system context and is identified by a task identifier. The task identifier for an executing instantiation of the encryption module is typically used as a user identifier that is stored in the user ID field 420, thereby enabling access by the encryption module 385 to the file encryption key that is encrypted according to the recovery key.

When an executing process (350, 355) needs to create a new volume on computer readable medium, the encryption module 385 further minimally causes the processor 300 to receive a volume creation directive from the executing process (350, 355). In response, the encryption module 385 further minimally causes the processor 300 to create a volume encryption key. The processor 300 is also further minimally caused to receive a user access key from the executing process (350, 355). Using the user access key, the encryption module 385 then encrypts the newly created volume encryption key and stores 515 the newly encrypted volume encryption key in the volume key table 360. It should be appreciated that the processor 300, as it continues to execute this alternative embodiment of an encryption module 385, will store the encrypted volume key along with a volume identifier and a user identifier in a particular record in the volume key table 360. It should be noted that a record in the volume key table 360 that is used to store the encrypted volume key, the volume identifier and a user identifier includes fields for storing the volume identifier (volume ID field 395), the user identifier (user ID field 400) and the encrypted volume key (encrypted volume key field 410).

According to yet another alternative embodiment, the encryption module 385 further minimally causes the processor 300 to generate a recovery key, encrypt the volume encryption key according to the recovery key and store the encrypted volume encryption key in the volume key table 360. In this situation, the encryption module 385 further minimally causes the processor 300 to store the encrypted volume key in the encrypted volume key field 410 of a record stored in the file key table 360. The processor 300 is further minimally caused to store a volume identifier in the volume ID field 395 of that particular record. The processor 300 is also further minimally caused to store the recovery key in the user access key field 405. The processor 300, according to this alternative embodiment, is further minimally caused to store a user identifier in the user identifier field 400. Typically, the encryption module 385 operates as a protected process in an operating system context and is identified by a task identifier. The task identifier for an executing instantiation of the encryption module is typically used as a user identifier that is stored in the user ID field 400, thereby enabling access by the encryption module 385 to the volume encryption key that is encrypted according to the recovery key.

One alternative embodiment of a system for managing encrypted data on a computer readable medium further comprises a local temporary file module 450, which is a media driver. The local temporary file module 450, when executed by the processor 300, minimally causes the processor to receive 535 encrypted data from the load-store module 390. The local temporary file module 450 causes the processor 300 to store 580 the encrypted data in the memory 315. It should be appreciated that the local temporary file module 450 causes the processor to organize a portion of the memory 315 such that this portion of the memory 315 can be addressed much akin to that of any generic form of computer readable medium, for example a hard drive. As such, one alternative embodiment of the local temporary file module 450 minimally causes the processor 300 to organize a portion of the memory 315 into individually addressable sectors.

In another alternative illustrative embodiment, the system for managing data on a computer readable medium in an encrypted manner further comprises a local file module 455, which also is considered to be a media driver. In this alternative embodiment, the local file module 455, when executed by the processor 300, minimally causes the processor to receive 570 encrypted data from the load-store module 390. The local file module 455 further minimally causes the processor 300 to control a computer readable medium interface (I/F) 325. Under such control, the processor directs 590 the encrypted quantum of data to the computer readable medium interface 325. The computer readable medium interface 325 then conveys 595 encrypted data to the computer readable medium 330.

In yet another alternative example embodiment, the system for managing data on a computer readable medium in an encrypted manner further comprises a remote file module 460 and a protocol stack 465. The protocol stack 465, when executed by the processor 300, minimally causes the processor to establish a communications connection with a remote file system. Typically, the protocol stack 465 embodies a communications protocol (e.g. transfer control protocol/Internet protocol, a.k.a. TCP/IP). Accordingly, the processor 300, as it executes the protocol stack 465, is minimally caused to control a network interface 335 and establish a connection with a remote file system by means of the network interface 335. It should be appreciated that the protocol stack 465 will typically include multiple layers, each corresponding to a layer in a communications protocol definition. The remote file module 460, when executed by the processor 300, minimally causes the processor to receive 575 encrypted data from the load-store module 390. As such, the remote file module 460 further minimally causes the processor 300 to interact 600 with the protocol stack 465. Interaction 600 with the protocol stack 465 causes the processor 300 to convey the encrypted data to protocol stack 465. Accordingly, the protocol stack will receive the encrypted data from the remote file module 460 in order to propagate the encrypted data to the remote file system using a communications connection established therewith.

FIG. 16 further illustrates that one alternative example embodiment of a system for managing encrypted data on a computer readable medium further comprises a decryption module 380. Typically, the data management module 375 further minimally causes the processor 300 to receive (500, 505) a request for a quantum of encrypted data from an executing process (350, 355). The data management module 375 further minimally causes the processor 300 to direct 540 the request received from an executing process (350, 355) to the decryption module 380. The request is also propagated to the load-store module 390. In response, the load-store module 390, when executed by the processor 300, further minimally causes the processor 300 to retrieve from a computer readable medium a quantum of encrypted data. The decryption module 380, when executed by the processor 300, minimally causes the processor to determine a decryption key for the quantum of encrypted data. The decryption module 380 further minimally causes the processor 300 to decrypt the quantum of encrypted data. Once decrypted, the processor 300 continues executing the data management module 375 which further minimally causes the processor to provide the decrypted data back to the executing process (350, 355) that requested the data.

According to one alternative example embodiment, the decryption module 380 causes the processor to determine a decryption key by minimally causing the processor 300 to receive a user access key from the executing process (350, 355). An encrypted volume key is retrieved from the volume key table 360 when the data to be retrieve from computer readable medium comprises volume data. Accordingly, an encrypted volume key is retrieve 545 from the volume key table 360. The decryption module 380 further minimally causes the processor 300 to decrypt the encrypted volume key according to the received user access key. Once decrypted, the volume key is used to decrypt the encrypted data retrieved from the computer readable medium when the processor 300 executes the load-store module 390. It should be appreciated that the processor 300 will decrypt the encrypted data using the decrypted volume key as it continues to execute this alternative embodiment of a decryption module 380. It should be appreciated that the volume key table 360 is typically stored in the memory 315. However, it should be further appreciated that the volume key table 360, according to one alternative embodiment, is refreshed from a more permanent computer readable medium, for example a hard disk. Accordingly, in the event that the volume key table 360 stored in the memory 315 is somehow lost, it can again be retrieved from the more permanent computer readable medium.

According to another alternative embodiment, the decryption module 380 causes the processor 300 to determine a decryption key by minimally causing the processor 300 to retrieve 555 a temporal key from the temporary key table 370 when the data to be retrieved from the computer readable medium comprises at least one of temporary file data, transient volume data and swap volume data commensurate with the teachings of the present method.

According to one alternative example embodiment, the decryption module 380 causes the processor 300 to determine a decryption key by minimally causing the processor 300 to receive a user access key from the executing process (350, 355). An encrypted file key is retrieve from the file key table 365, when the data to be retrieve from computer readable medium comprises file data. Accordingly, an encrypted file key is retrieved 550 from the file key table 365. The decryption module 380 further minimally causes the processor 300 to decrypt the encrypted file key according to the received user access key. Once decrypted, the file key can then be used to decrypt the encrypted data retrieve from the computer readable medium when the processor 300 executes the load-store module 390. It should be appreciated that the processor 300 will decrypt the encrypted data using the decrypted file key as it continues execute this alternative embodiment of a decryption module 380. It should be appreciated that the file key table 365 is typically stored in the memory 315. However, it should be further appreciated that the file key table 365 can be refreshed from a more permanent computer readable medium, for example a hard disk. Accordingly, in the event that the file key table 360 stored in the memory 315 is somehow lost, it can again be retrieved from the more permanent computer readable medium.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for managing encrypted data on a computer readable medium comprising:
   receiving a quantum of data by a system for managing data;
   determining an encryption key for the received quantum of data, the determining by the system for managing data;
   encrypting, by the system for managing data, the quantum of data according to a volume key at a volume level when the quantum of data comprises a quantum of volume data;
   encrypting, by the system for managing data, the quantum of data according to a file key, different than the volume key, at a file level when the quantum of data comprises a quantum of file data; and
   directing the encrypted data to a first computer readable medium by the system for managing data.

2. The method of claim 1 wherein determining an encryption key comprises:
   receiving a user access key;
   retrieving an encrypted volume key from a computer readable medium; and decrypting the encrypted volume key according to the user access key.

3. The method of claim 1 wherein determining an encryption key comprises retrieving a temporal key from a memory when a quantum of data comprises at least one of a temporary file, a transient volume and a swap volume.

4. The method of claim 1 wherein determining an encryption key comprises:
receiving a user access key;
retrieving an encrypted file key from a computer readable medium; and
decrypting the encrypted file key according to the user access key.

5. The method of claim 1 further comprising:
receiving a file creation directive;
creating a file encryption key;
receiving a user access key; and
encrypting the file encryption key according to the user access key.

6. The method of claim 5 further comprising:
receiving one or more recovery keys; and
encrypting the file encryption key according to the one or more recovery keys.

7. The method of claim 1 further comprising:
receiving a volume creation directive;
creating a volume encryption key;
receiving a user access key; and
encrypting the volume encryption key according to the user access key.

8. The method of claim 7 further comprising:
receiving one or more recovery keys; and
encrypting the volume encryption key according to the one or more recovery keys.

9. The method of claim 1 wherein directing the encrypted data to a first computer readable medium comprises directing the encrypted data to at least one of a local physical file system, a local temporary file system and a remote file system.

10. The method of claim 1 further comprising:
receiving a request for a quantum of data;
retrieving from the computer readable medium a quantum of data according to the request;
determining a decryption key;
decrypting the quantum of data at a volume level when the quantum of data comprises a quantum of volume data;
decrypting the quantum of data at a file level when the quantum of data comprises a quantum of file data; and
providing the decrypted data in response to the request.

11. The method of claim 10 wherein determining a decryption key comprises:
receiving a user access key;
retrieving an encrypted volume key from a computer readable medium; and
decrypting the encrypted volume key according to the user access key.

12. The method of claim 10 wherein determining a decryption key comprises retrieving a temporal key from a memory when a quantum of data comprises at least one of a temporary file, a transient volume and a swap volume.

13. The method of claim 10 wherein determining a decryption key comprises:
receiving a user access key;
retrieving an encrypted file key from a computer readable medium; and
decrypting the encrypted file key according to the user access key.

14. A system for managing data on a computer readable medium in an encrypted manner comprising:
processor capable of executing an instruction sequence;
media interface unit capable of directing data to and retrieving data from a computer readable medium;
memory capable of storing one or more instruction sequences and further capable of storing data;
one or more instruction sequences stored in the memory including:
data management module that, when executed by the processor, minimally causes the processor to receive a quantum of data from a executing process;
encryption module that, when executed by the processor, minimally causes the processor to:
determine an encryption key for the received quantum of data;
encrypt,. using a volume key, the quantum of data at a volume level when the quantum of data comprises volume data;
encrypt, using a file key different than the volume key, the quantum of data at a file level when the quantum of data comprises file data;
load-store module that, when executed by the processor, minimally causes the processor to direct the encrypted quantum of data to a media driver module.

15. The system of claim 14 wherein the encryption module causes the processor to determine an encryption key by minimally causing the processor to:
receive a user access key from the executing process;
retrieve an encrypted volume key from a volume key table; and
decrypt the encrypted volume key according to the received user access key.

16. The system of claim 14 wherein the encryption module causes the processor to determine an encryption key by minimally causing the processor to retrieve a temporal key from a temporal key table when the quantum of data comprises at least one of a temporary file, a transient volume and a swap volume.

17. The system of claim 14 wherein the encryption module causes the processor to determine an encryption key by minimally causing the processor to:
receive a user access key from the executing process;
retrieve an encrypted file key from a file key table; and
decrypt the encrypted file key according to the received user access key.

18. The system of claim 14 wherein the encryption module further minimally causes the processor to:
receive a file creation directive from the executing process;
create a file encryption key;
receive a user access key;
encrypt the file encryption key according to the user access key; and
store the encrypted file encryption key in a file key table.

19. The system of claim 18 wherein the encryption module further minimally causes the processor to:
generate a recovery key;
encrypt the file encryption key according to the recovery key; and
store the encrypted file encryption key in the file key table.

20. The system of claim 14 wherein the encryption module further minimally causes the processor to:
receive a volume creation directive from the executing process;
create a volume encryption key;
receive a user access key;

encrypt the volume encryption key according to the user access key; and store the encrypted volume encryption key in a volume key table.

21. The system of claim 20 wherein the encryption module further minimally causes the processor to:
retrieve a recovery key;
encrypt the volume encryption key according to the recovery key; and
store the encrypted volume encryption key in the volume key table.

22. The system of claim 14 further comprising a local temporary file module that, when executed by the processor, minimally causes the processor to store the encrypted quantum of data in the memory.

23. The system of claim 14 wherein the media interface comprises a computer readable medium controller further comprising a local file module that, when executed by the processor, minimally causes the processor to direct the encrypted quantum of data to the computer readable medium controller.

24. The system of claim 14 wherein the media interface comprises a network interface further comprising a protocol stack that, when executed by the processor, minimally causes the processor to establish a communications connection with a remote file system using the network interface and further comprising a remote file mode that, when executed by the processor, minimally causes the processor to establish a communications channel with a remote file system using the protocol stack and direct the encrypted quantum of data to the remote file system using the established communications connection.

25. The system of claim 14 further comprising a decryption module that, when executed by the processor, minimally causes the processor to:
determine a decryption key for a quantum of encrypted data; and
decrypt a quantum of encrypted data according to the determined decryption key
wherein the load-store module, when executed by the processor, further minimally causes the processor to dispatch to the media driver a request for a quantum of encrypted data and wherein the data management module further minimally causes the processor to:
receive a request for a quantum of data from the executing module;
execute the load-store module in order to retrieve a quantum of encrypted data from the media driver;
execute the decryption module in order to decrypt a quantum of encrypted data; and
provide the decrypted quantum of data to the executing process.

26. The system of claim 25 wherein the decryption module causes the processor to determine a decryption key by minimally causing the processor to:
receive a user access key from the executing process;
retrieve an encrypted volume key from a volume key table; and
decrypt the encrypted volume key according to the received user access key.

27. The system of claim 25 wherein the decryption module causes the processor to determine a decryption key by minimally causing the processor to retrieve a temporal key from a temporal key table when the quantum of data comprises at least one of a temporary file, a transient volume and a swap volume.

28. The system of claim 25 wherein the decryption module causes the processor to determine a decryption key by minimally causing the processor to:
receive a user access key from the executing process;
retrieve an encrypted file key from a file key table; and
decrypt the encrypted file key according to the received user access key.

29. A computer readable medium having imparted thereon one or more instruction sequences for managing data on a computer readable medium in an encrypted manner comprising:
data management module that, when executed by a processor, minimally causes a processor to receive a quantum of data from an executing process;
encryption module that, when executed by a processor, minimally causes a processor to:
determine an encryption key for the received quantum of data;
encrypt, using a volume key, the quantum of data at a volume level when the quantum of data comprises volume data;
encrypt, using a file key different than the volume key, the quantum of data at a file level when the quantum of data comprises file data;
load-store module that, when executed by a processor, minimally causes a processor to direct the encrypted quantum of data to a media driver module.

30. The computer readable medium of claim 29 wherein the encryption module causes a processor to determine an encryption key by minimally causing the processor to:
receive a user access key from the executing process;
retrieve an encrypted volume key from a volume key table; and
decrypt the encrypted volume key according to the received user access key.

31. The computer readable medium of claim 29 wherein the encryption module causes a processor to determine an encryption key by minimally causing a processor to retrieve a temporal key from a temporal key table when the quantum of data comprises at least one of a temporary file, a transient volume and a swap volume.

32. The computer readable medium of claim 29 wherein the encryption module causes a processor to determine an encryption key by minimally causing a processor to:
receive a user access key from the executing process;
retrieve an encrypted file key from a file key table; and
decrypt the encrypted file key according to the received user access key.

33. The computer readable medium of claim 29 wherein the encryption module further minimally causes a processor to:
receive a file creation directive from an executing process;
create a file encryption key;
receive a user access key;
encrypt the file encryption key according to the user access key; and
store the encrypted file encryption key in a file key table.

34. The computer readable medium of claim 33 wherein the encryption module further minimally causes a processor to:
generate a recovery key;
encrypt the file encryption key according to the recovery key; and
store the encrypted file encryption key in the file key table.

35. The computer readable medium of claim 29 wherein the encryption module further minimally causes a processor to:

receive a volume creation directive from an executing process;

create a volume encryption key;

receive a user access key;

encrypt the volume encryption key according to the user access key; and store the encrypted volume encryption key in a volume key table.

36. The computer readable medium of claim 35 wherein the encryption module further minimally causes a processor to:

generate a recovery key;

encrypt the volume encryption key according to the recovery key; and store the encrypted volume encryption key in the volume key table.

37. The computer readable medium of claim 29 further comprising a decryption module that, when executed by a processor, minimally causes a processor to:

determine a decryption key for a quantum of encrypted data; and decrypt a quantum of encrypted data according to the determined decryption key wherein the load-store module, when executed by a processor, further minimally causes the processor to dispatch to a media driver a request for a quantum of encrypted data and wherein the data management module further minimally causes a processor to:

receive a request for a quantum of data from the executing module;

execute the load-store module in order to retrieve a quantum of encrypted data from a media driver;

execute the decryption module in order to decrypt a quantum of encrypted data; and provide the decrypted quantum of data to an executing process.

38. The computer readable medium of claim 37 wherein the decryption module cause a processor to determine a decryption key by minimally causing a processor to:

receive a user access key from the executing process;

retrieve an encrypted volume key from a volume key table; and decrypt the encrypted volume key according to the received user access key.

39. The computer readable medium of claim 37 wherein the decryption module causes a processor to determine a decryption key by minimally causing a processor to retrieve a temporal key from a temporal key table when the quantum of data comprises at least one of a temporary file, a transient volume and a swap volume.

40. The computer readable medium of claim 37 wherein the decryption module causes a processor to determine a decryption key by minimally causing a processor to:

receive a user access key from the executing process;

retrieve an encrypted file key from a file key table; and decrypt the encrypted file key according to the received user access key.

41. A system for managing data on a computer readable medium in an encrypted manner comprising:

means for determining an encryption key for a quantum of data;

means for determining a type for the quantum of data;

means for encrypting the quantum of data at a volume level, and using a volume key, when said data comprises volume data; and means for encrypting the quantum of data at a file level, and using a file key different than the volume key, when said data comprises file data.

* * * * *

UNITED STATES PATENT AND TRADEMARK OFFICE
CERTIFICATE OF CORRECTION

| | | |
|---|---|---|
| PATENT NO. | : 7,590,868 B2 | Page 1 of 1 |
| APPLICATION NO. | : 11/055245 | |
| DATED | : September 15, 2009 | |
| INVENTOR(S) | : Mehmet Musa et al. | |

It is certified that error appears in the above-identified patent and that said Letters Patent is hereby corrected as shown below:

In column 14, line 17, in Claim 14, delete "encrypt,." and insert -- encrypt, --, therefor.

In column 18, line 4, in Claim 38, delete "cause" and insert -- causes --, therefor.

Signed and Sealed this

Fourteenth Day of September, 2010

David J. Kappos
*Director of the United States Patent and Trademark Office*